Sept. 20, 1932.　　　P. S. LEGGE　　　1,878,414
TOOL FOR CUTTING STONE
Filed Oct. 30, 1928
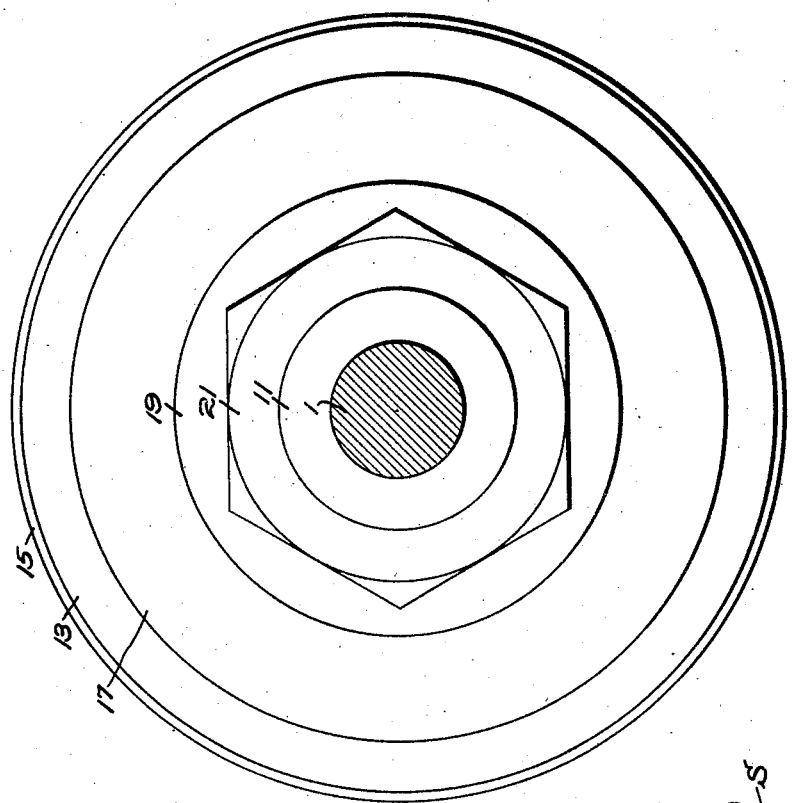
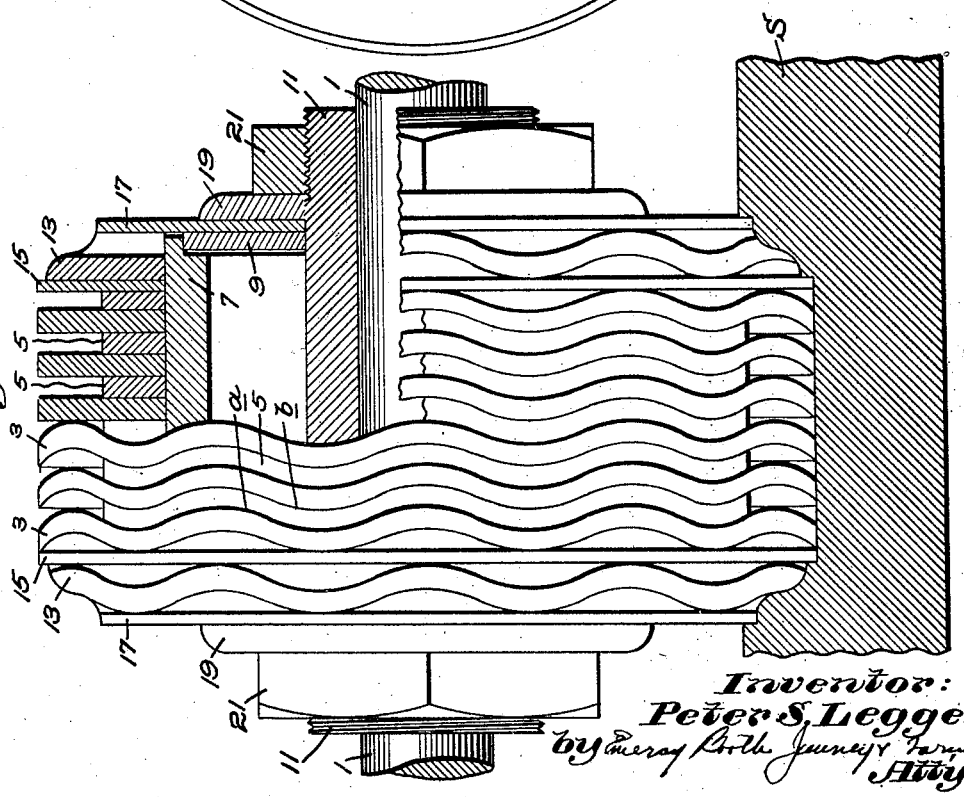
Inventor:
Peter S. Legge,
By Emery Booth Janney & Varney
Attys Patented Sept. 20, 1932

1,878,414

UNITED STATES PATENT OFFICE

PETER S. LEGGE, OF POMPTON LAKES, NEW JERSEY

TOOL FOR CUTTING STONE

Application filed October 30, 1928. Serial No. 316,074.

This invention relates to tools for cutting stone and will be best understood from the following description when read in the light of the accompanying drawing of one embodiment of the invention, while the scope of the invention will be more particularly pointed out in the appended claims.

In the drawing:—

Fig. 1 shows an elevation of a tool constructed according to the invention operating upon a stone S; and Fig. 2 is an end view of a tool constructed according to Fig. 1.

Referring to the drawing, the tool is shown as mounted upon a suitably driven shaft 1, said tool comprising a plurality of corrugated rings 3 spaced by corrugated washers 5, the outer peripheries of the rings 3 being concentric with the axis of the shaft 1. Conveniently the rings and washers 3 and 5 may be mounted upon a sleeve 7 held in spaced concentric relation with the shaft 1 by end discs 9 mounted upon a sleeve 11, the latter surrounding the shaft and being secured thereto in non-rotate relation by any convenient means.

Herein the tool is arranged for cutting a sunken panel with ogee sides, and for this purpose corrugated rings 13 are provided, the outer peripheries of which are turned or otherwise formed to present an ogee shape in profile, as indicated in Fig. 1. Separating the rings 13 from the rings 3 are flat discs 15 transverse to the shaft, while at the extreme ends of the tool are similar flat discs 17, the diameter of the discs 15 and 17 being such as to cut the square corners of the panel formed in the surface of the stone.

As shown, collars 19 are placed over the ends of the sleeve and are forced toward each other by nuts 21 screw threaded on the sleeve so as to clamp the several rings and washers in assembled relation.

In practice, the points $a$ on the corrugations line up with or overlap the points $b$ on adjacent rings so that a smooth surface will be formed in the stone when chilled shot and water or like abrasive are fed to the cut.

In practice, I have found that excellent results can be secured with corrugated discs about twenty-four inches outside diameter and twenty inches inside diameter, the discs being about a quarter of an inch thick.

It will be understood that wide deviations may be made from the submitted embodiment of the invention without departing from its spirit.

I claim:

1. A stone working tool of the type having a power driven arbor comprising, in combination, means for cutting the stone with abrasive fed to the cut to form an uncreased finished surface, said means including a plurality of projecting members formed to present peripheral band-like surfaces on a plurality of coaxial surfaces of revolution of different diameters with said band-like surfaces being so formed that their points of contact with the stone will reciprocate axially of the tool when the latter is rotated, disk saw means coaxial with said surfaces of revolution and positioned between them in abutting relation therewith, said disk saw means having a diameter not less than the diameter of the adjacent abutting surfaces of revolution of greatest diameter, the cut caused by said disk saw means intersecting the cuts caused by said band-like surfaces.

2. A stone working tool of the type having a power driven arbor comprising, in combination, means for cutting the stone with abrasive fed to the cut to form an uncreased finished surface, said means including a plurality of projecting corrugated members formed to present preipheral sinuous band-like surfaces on a plurality of coaxial surfaces of revolution of different diameters with said band-like surfaces being so formed that their points of contact with the stone will reciprocate axially of the tool when the latter is rotated, disk saw means coaxial with said surfaces of revolution and positioned between them in abutting relation therewith, said disk saw means having a diameter not less than the diameter of the adjacent abutting surfaces of revolution of greatest diameter, the cut caused by said disk saw means intersecting the cuts caused by said band-like surfaces.

In testimony whereof, I have signed my name to this specification.

PETER S. LEGGE.